(12) United States Patent
Lowenstein et al.

(10) Patent No.: US 6,848,265 B2
(45) Date of Patent: Feb. 1, 2005

(54) AIR CONDITIONING SYSTEM

(75) Inventors: Andrew Lowenstein, Princeton, NJ (US); Jeffrey Miller, Rocky Hill, NJ (US); Peter Gruendeman, Hopewell, NJ (US); Michael DaSilva, Franklin Park, NJ (US)

(73) Assignee: Ail Research, Inc., Princeton, NJ (US)

( * ) Notice: Subject to any disclaimer, the term of this patent is extended or adjusted under 35 U.S.C. 154(b) by 0 days.

(21) Appl. No.: 10/422,460

(22) Filed: Apr. 24, 2003

(65) Prior Publication Data

US 2003/0230092 A1 Dec. 18, 2003

Related U.S. Application Data

(60) Provisional application No. 60/375,108, filed on Apr. 24, 2002.

(51) Int. Cl.[7] .......................... F25D 17/04; F25D 17/06; F25D 23/00; F28D 5/00; F28C 1/00
(52) U.S. Cl. ............................... 62/186; 62/94; 62/271; 62/314; 62/315
(58) Field of Search ........................ 62/94, 186, 271, 62/314, 315, 93, 97

(56) References Cited

U.S. PATENT DOCUMENTS 5,187,946 A * 2/1993 Rotenberg et al. ............ 62/314
5,351,497 A * 10/1994 Lowenstein ................... 62/94
6,581,402 B2 * 6/2003 Maisotsenko et al. ........ 62/315

OTHER PUBLICATIONS

Maisotsenko, Method of evaporative cooling of a fluid and apparatus therefor, Feb. 20, 2003, US PGP 2003/0033821, all pages.*

* cited by examiner

Primary Examiner—William Doerrler
Assistant Examiner—Filip Zec
(74) Attorney, Agent, or Firm—Watov & Kipnes, P.C.

(57) ABSTRACT

An air conditioner comprises a plurality of plates arranged in a successively stacked configuration with portions thereof having a spaced apart arrangement, and defining between successive adjacent pairs of plates at the spaced apart portions a first and second series of discrete alternating passages wherein a first air stream is passed through the first series of passages and a second air stream is passed through the second series of passages; and said stacked configuration of plates forming integrally therewith a liquid delivery means for delivering from a source a sufficient quantity of a liquid to the inside surfaces of the first series of fluid passages in a manner which provides a continuous flow of the liquid from a first end to a second end of the plurality of plates while in contact with the first air stream.

41 Claims, 7 Drawing Sheets

AIR CONDITIONING SYSTEM

This application claims the benefit of Provisional Application No. 60/375,108 filed Apr. 24, 2002.

GOVERNMENTAL INTEREST

This invention was made with Government support under Contract No. DE-FG02-99ER82735 awarded by the Department of Energy. The Government has certain rights in this invention.

FIELD OF THE INVENTION

The present invention is related generally to air conditioning systems, and more particularly to air conditioning systems assembled from modular components for cost effective fabrication.

BACKGROUND OF THE INVENTION

Large amounts of energy are devoted in this country to processes related moisture removal. Such processes include agricultural and industrial applications wherein feedstocks and other final products need to be dried, and indoor air conditioning for maintaining low air moisture levels in indoor spaces. One method of removing moisture involves the use of desiccants. Desiccants have a high affinity for water vapor and readily absorb moisture present in the air. Dehumidifiers using desiccants to remove moisture operate chiefly on heat and can be readily adapted for use with solar thermal energy or waste heat sources. However, use of such dehumidifiers has been limited due to their large size and high installation and maintenance costs.

Desiccant-based dehumidifier systems may be used as a stand-alone system or in combination with conventional air-conditioning to improve the indoor air quality of all types of buildings. In these systems, a desiccant removes moisture from the process air, which releases heat and increases the air temperature. The dry process air may be cooled using either evaporative cooling or the cooling coils of a conventional air conditioner. The absorbed moisture in the desiccant is then removed (the desiccant is regenerated to its original dry state) using thermal energy supplied by natural gas, electricity, waste heat, or the sun. Commercially available desiccants include silica gel, activated alumina, natural and synthetic zeolites, titanium silicate, lithium chloride, and synthetic polymers.

Evaporatively cooled liquid desiccant dehumidifier systems have shown promising performance results. One type of evaporatively cooled liquid desiccant dehumidifying system includes a conditioner having a plurality of parallel spaced-apart plates. The plates are arranged in a manner to form first and second series of discrete alternating fluid passages. The plates further include a plurality of spacers which cooperate with adjacent plates to maintain the spaced apart arrangement therebetween.

Process air (i.e., air to be dehumidified) is passed through the first series of fluid passages and cooling air is passed through the second series of fluid passages. The moisture containing process air enters first series of fluid passages via a moist air inlet and dried process air exits the conditioner via a dried air outlet.

A liquid desiccant is typically sprayed onto the inside surfaces of the first fluid passages where it flows therealong in contact with the passing moisture containing process air. During dehumidification, heat is released as the water vapor condenses and mixes with the liquid desiccant. The process air heats from the latent heat of evaporation as the moisture is removed and also, to a lesser degree from the transfer of heat from the generally warmer desiccant. The water saturated desiccant is collected in a reservoir and pumped to a regenerator where it is heated to drive off the absorbed water as vapor. The regenerated desiccant, which is further heated up in this process, is pumped back to the conditioner for reuse. Since the water absorption process leads to heating of the air and the regeneration process heats the desiccant, substantial heating of the air takes place during the water absorption process.

To lower the enthalpy of the process air to produce a net cooling effect, the desiccant can be cooled as it flows down the inside surfaces of the first series of fluid passages. This can be accomplished by applying water to the inside surfaces of the second series of fluid passages and passing cooling air therethrough. The cooling air evaporates the water and cools the desiccant in the first series of fluid passages. As a result, the heat released by the absorption of moisture in the desiccant is transferred through the plates and the process air is dried while possessing a lower enthalpy than when it entered the conditioner.

Prior art evaporatively cooled liquid desiccant dehumidifier systems typically encounter several problems during operation. Due primarily to the high flow rates of liquids that are either sprayed or dripped on the inside surfaces of the fluid passages, the liquid desiccant and the cooling water has a tendency to span or bridge across the respective air streams along the inside surfaces of the first and second fluid passages, respectively. This produces higher flow resistance and pressure drops across the inlet and outlet of the air streams, and facilitates the formation of droplets which may become entrained within the air streams.

Accordingly, there is a need in the art of air conditioners to design an air conditioner that avoids the problems of the prior art while substantially reducing the costs associated with fabrication and operation. It would be further desirable to design an air conditioner preferably in the form of a liquid desiccant dehumidifier system exhibiting improved air flow and moisture removing capacity while minimizing undesirable entrainment of the liquid desiccant in the process air flow.

SUMMARY OF THE INVENTION

In accordance with the present invention, there is provided an air conditioner which comprises:

a plurality of plates arranged in a successively stacked configuration with portions thereof having a spaced apart arrangement, and defining between successive adjacent pairs of plates at said spaced apart portions a first and second series of discrete alternating passages wherein a first air stream is passed through the first series of passages and a second air stream is passed through the second series of passages; and said stacked configuration of plates forming integrally therewith a liquid delivery means for delivering from a source a sufficient quantity of a liquid to the inside surfaces of the first series of fluid passages in a manner which provides a continuous flow of the liquid from a first end to a second end of the plurality of plates while in contact with the first air stream.

In one particular aspect of the present invention, there is provided an air conditioner which functions as a liquid desiccant dehumidifier system which utilizes a conditioner carrying a liquid desiccant to extract moisture from process air passed therethrough. In a preferred embodiment of the present invention, the system is also designed to further extract heat from the liquid desiccant which contacts the moist process air entering the system. Thus, the system produces dry air from the starting moist process air which exits the system cooler that it would be in the absence of heat transfer. The system of the present invention is less complicated to fabricate and results in greater cost savings than conventional liquid desiccant dehumidifier systems.

BRIEF DESCRIPTION OF THE DRAWINGS

The following drawings in which like reference characters indicate like parts are illustrative of embodiments of the invention and are not to be construed as limiting the invention as encompassed by the claims forming part of the application.

DETAILED DESCRIPTION OF THE INVENTION

The present invention is directed to air conditioning system which utilizes an air conditioner which may be adapted for performing various air treatment operations. Such air treatment operations may include, but is not limited to, changing the moisture and/or heat content of the air being processed.

The air conditioner of the present invention includes a plurality of plates which are adapted to be joined to one another in a stacked configuration. The joined plates define a first and a second series of discrete alternating passages wherein a first air stream is passed through the first series of passages and a second air stream is passed through the second series of passages. The first and second air streams are maintained physically separate from one another, while maintaining thermal contact to allow heat to freely pass therebetween. The stacked plates are further adapted to form integrally therewith a liquid delivery system which operates to deliver from a source of liquid a sufficient quantity of a liquid to the inside surface of the first series of passages in a manner which provides a continuous flow of the liquid while in contact with the first air stream. With appropriate modifications such as the selection of the first and second air stream and the type of liquid, the air conditioner of the present invention may be used for various applications including, but not limited to, indirect evaporative cooling, liquid desiccant dehumidification and the like.

Figure 1:
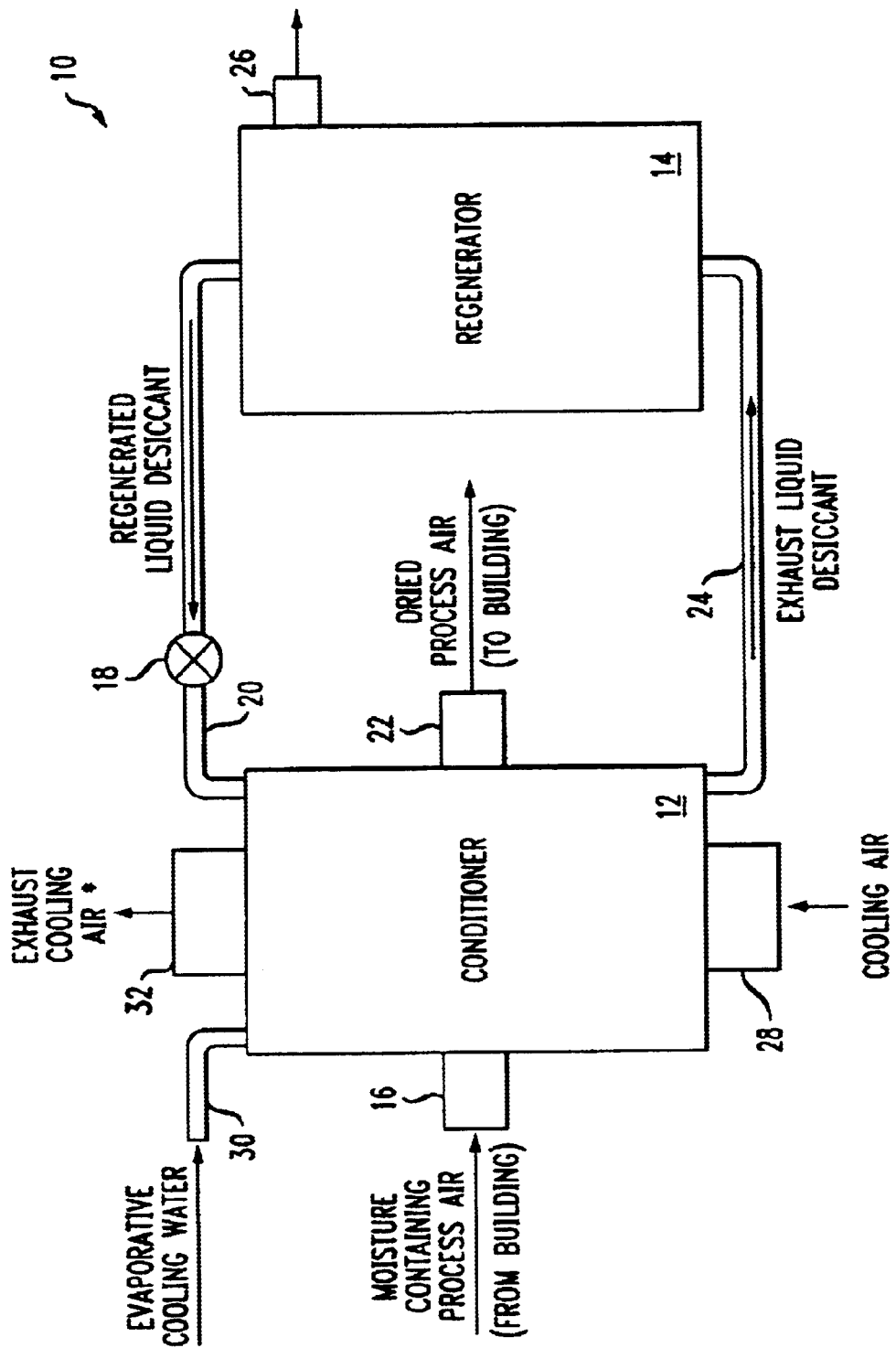
FIG. 1 is a schematic view of a liquid desiccant dehumidifier system in accordance with one embodiment of the present invention.

By way of example and reflecting a first embodiment of the present invention, there is shown in FIG. 1, a schematic representation of a liquid desiccant dehumidifier system generally designated by the reference numeral 10 for one application of the present invention. The dehumidifier system 10 generally comprises a conditioner 12 for dehumidifying air and a regenerator 14 for regenerating liquid desiccant.

Process air (e.g., air from a building) is fed into the conditioner 12 via a moist process air inlet 16 (e.g., from the building) and comes into contact with a liquid desiccant. The liquid desiccant is pumped from the regenerator 14 by a pump 18 through a liquid desiccant supply conduit 20 to a series of distribution or feeder tubes (not shown). The liquid desiccant is dispensed directly to the surface of the first series of fluid passages 36 within the conditioner 12 and comes into contact with the process air as will be further described in detail hereinafter. The dispensing of liquid desiccant is accomplished without the creation of droplets such as would occur through the use of sprays. The liquid desiccant flows slowly in continuous contact with the process air and collected in a reservoir (not shown).

Since the liquid desiccant is hygroscopic, it absorbs water vapor from the moist process air and drier air is expelled through a dried process air outlet 22 (e.g., return to building). The reservoir is located at the bottom of the conditioner 12 whereby the liquid desiccant delivered from the liquid desiccant supply conduit 20 flows downwardly into the reservoir.

The exhaust liquid desiccant discharged by the conditioner 12 passes through a drain conduit 24 to the regenerator 14. The exhaust liquid desiccant is regenerated in the regenerator 14 which may be in the form of a boiler. The regenerator 14 heats the liquid desiccant to drive off part of the water vapor it has removed, thus regenerating it. The regenerated liquid desiccant returns to the conditioner 12 to remove moisture. The liquid water or water vapor is discharged from the regenerator 14 through a water outlet 26.

The conditioner 12 is further configured to transfer heat released in the liquid desiccant as the water vapor is removed from the process air by bringing the liquid desiccant stream into thermal (but not physical) contact with a cooling water stream in combination with a cooling air flow. The cooling air entering the conditioner 12 via a cooling air inlet 28 evaporates the cooling water entering via a cooling water conduit 30, which lowers the temperature of the cooling water. This transfer of heat energy results in a reduced temperature of the liquid desiccant which causes the temperature of the air being dried to be lowered. The cooling air and the vaporized cooling water are expelled from the conditioner 12 via a cooling air outlet 32.

Figure 2:
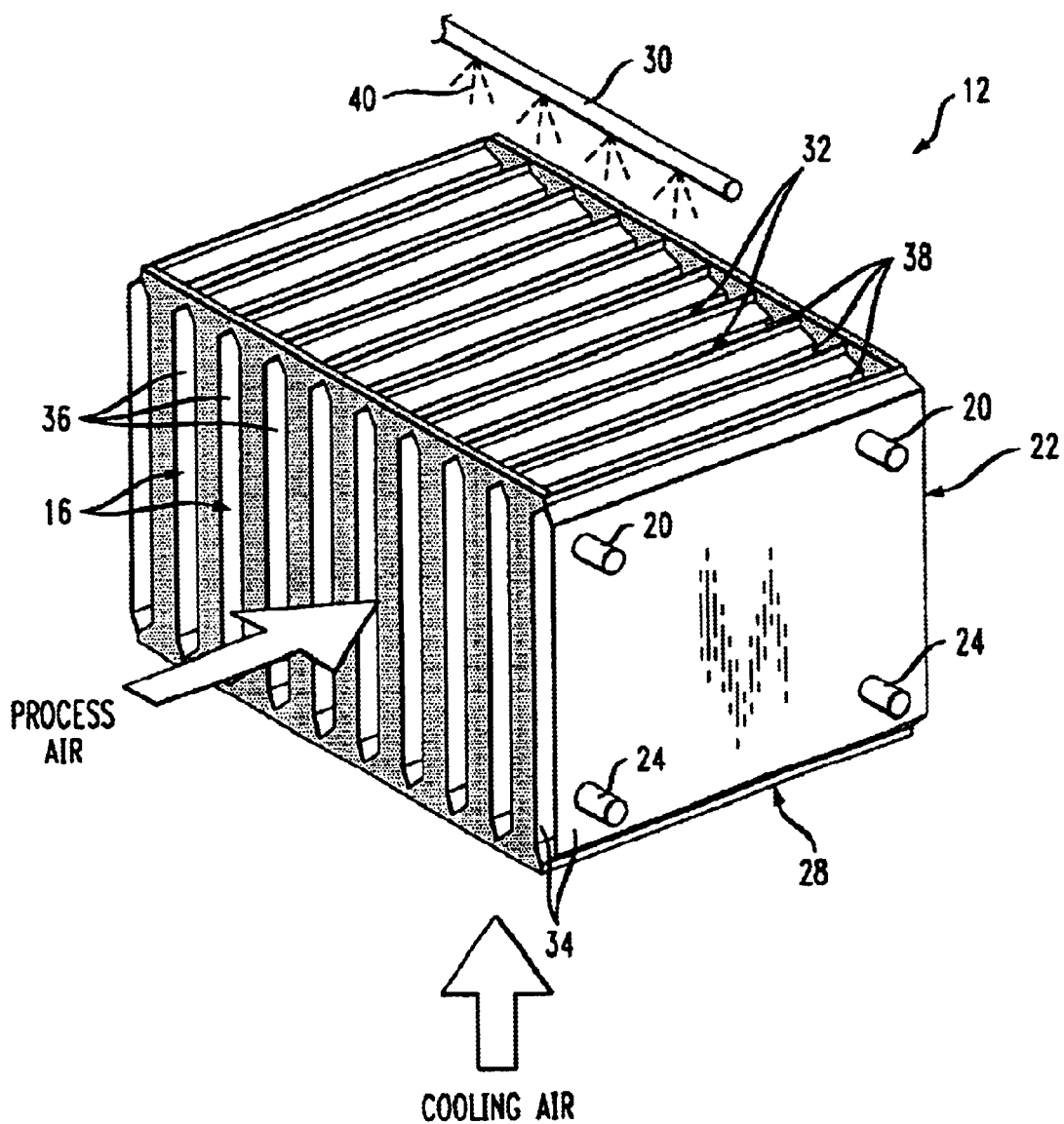
FIG. 2 is a perspective view of a conditioner of the liquid desiccant dehumidifier system in accordance with one embodiment of the present invention.

Referring to FIG. 2, the conditioner 12 is shown in greater detail to illustrate the cross flow interaction between the process air stream and the cooling air stream. The conditioner 12 comprises a plurality of spaced-apart plates 34 to yield a cross-flow arrangement. The arrangement permits two discrete fluid streams to flow therethrough. In this example, process air passes horizontally through the moisture process air inlets 16 into corresponding process fluid passages 36 and exits through the dried air outlets 22. Cooling air passes vertically upward through the cooling air inlets 28 into corresponding cooling fluid passages 38 and exits through the cooling air outlets 32. Although the process air and the cooling air flows are maintained physically separate from one another, they remain in thermal contact with one another. The plates 34 may be comprised of a heat conductive material including, but not limited to, thermoformed plastic or metals such as aluminum, copper and alloys thereof. Plates 34 formed from metals may be coated with a corrosion resistant layer.

The conditioner 12 is further adapted to permit the liquid desiccant to enter through the liquid desiccant supply conduits 20 extending longitudinally therethrough. The liquid desiccant supply conduits 20 dispenses the liquid desiccant at the top end of the plates 34 into the process fluid passages 36 where it flows downwardly along the inside surfaces thereof. The upper portions of the process fluid passages 36 narrow to a common junction line where a series of distribution or feeder tubes are disposed to feed the liquid desiccant directly onto the inside surfaces of the passages 36 without the formation of droplets thus ensuring uniform coverage and flow down the inside surface of the passages 36. In this manner, the process air is maintained in contact with the liquid desiccant as it passes through the respective process fluid passages 36. In a preferred embodiment, the liquid desiccant may be delivered through an injection system from which the liquid desiccant can be injected directly onto the surface of the process fluid passages 36. As the liquid desiccant flows to the bottom end of the process fluid passages 36, it is collected into a reservoir (not shown) and drained through the drain conduit 24.

In a preferred embodiment, the process fluid passages 36 may further be lined with a wicking substrate (not shown) comprising a porous fluid passing material. The wicking substrate may be about 10 to 15 mils thick. The porous fluid passing material may be in the form of a wettable fiber selected from acrylics, polyesters, cotton, nylon, rayon, fiberglass and the like. The liquid desiccant may be injected into the wicking substrate through, for example, feeder tubes disposed along the length of the plates 34 and supplied from the liquid desiccant supply conduit 20. The liquid desiccant flows through the feeder tubes and uniformly wets the wicking substrate. Other methods of wetting the wicking substrate would be known to those skilled in the art and any such method may be used in the practice of the invention. The wicking substrate provides enhanced wetting of the contact surface while slowing the flow rate of the liquid desiccant to maximize contact time with the passing process air and to minimize undesirable "bridging" of liquid desiccant across the process fluid passages 36. Bridging of liquid desiccant can generate increase resistance against the process air flow, and undesirably producing liquid desiccant droplets which can become entrained in the process air flow.

The cooling water conduit 30 supplies a cooling water stream 40 on the inside surfaces of the cooling fluid passages 38 as the cooling air flows upwardly. The cooling water flowing along the sides of the cooling fluid passages 38 evaporates in contact with the cooling air flow. This imparts an evaporative cooling effect through the plates 34 onto the liquid desiccant flowing on the other side of the plate 34 in the process fluid passage 36. Thereby, the evaporative cooling effect effectively reduces the temperature of the liquid desiccant which in turn reduces the temperature and the enthalpy of the process air flow.

The cooling water stream 40 may be sprayed, dripped, injected or directly delivered to the inside surfaces of the cooling fluid passages 38. In a preferred embodiment, the cooling water may be delivered through an injection system from which the cooling water can be injected directly onto the surface of the cooling fluid passages 38. The cooling fluid passages 38 may further be lined with a wicking substrate (not shown) comprising a porous fluid passing material. The wicking substrate may be about 10 to 15 mils thick. The porous fluid passing material may be in the form of a wettable fiber selected from acrylics, polyesters, cotton, nylon, rayon, fiberglass and the like. The cooling water may be dripped, sprayed or injected into the wicking substrate through, for example, feeder tubes or spray nozzles along the length of the conditioner 12 supplied from the cooling water supply conduit 30. The cooling water flows through the conduit 30 and uniformly wets the wicking substrate. Other methods of wetting the wicking substrate would be known to those skilled in the art and any such method may be used in the practice of the invention.

Figure 3:
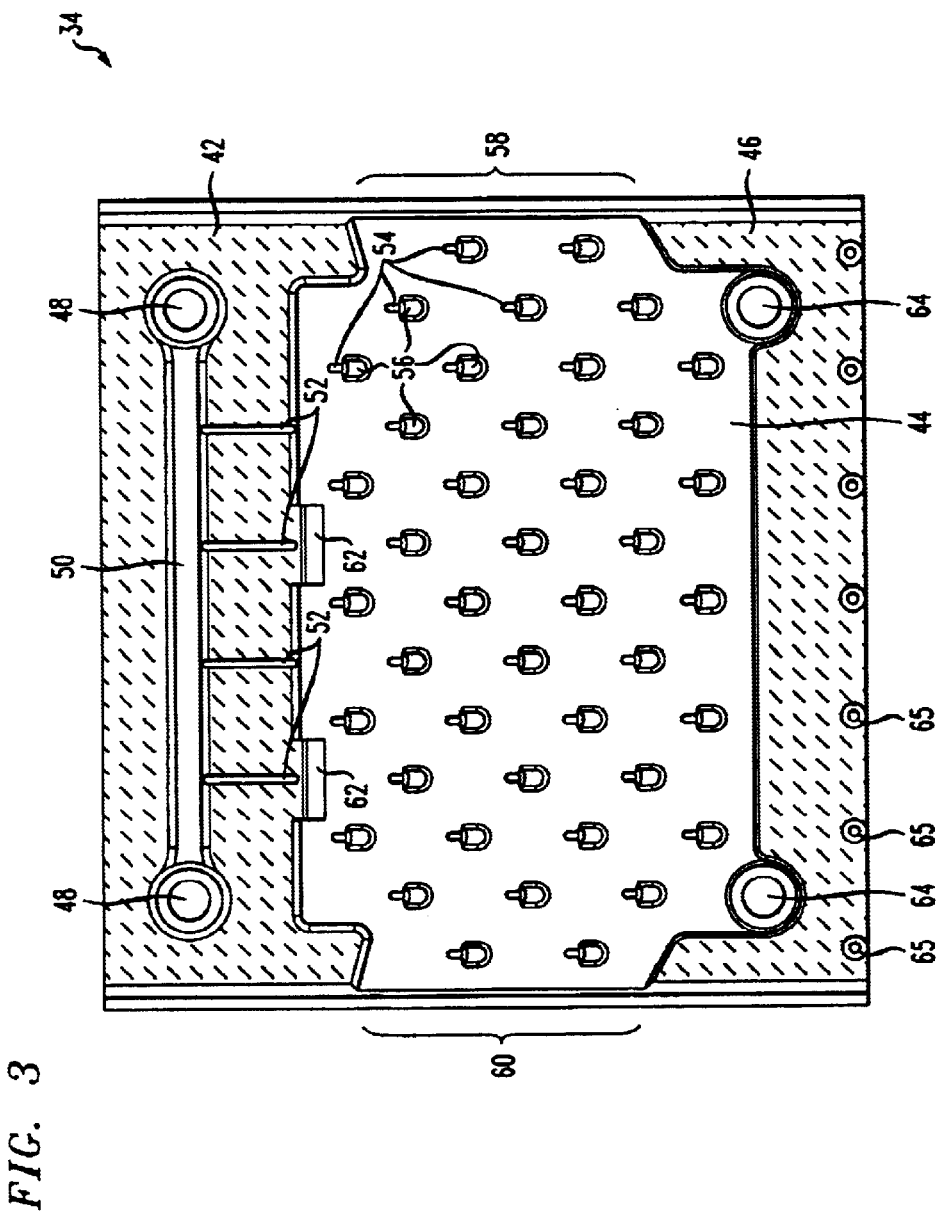
FIG. 3 is a front elevational view of a plate forming part of the conditioner in accordance with one embodiment of the present invention.

Referring to FIG. 3, a plate 34 forming part of the conditioner 12 is shown for one embodiment of the present invention. The plurality of plates 34 can be readily assembled and joined to fabricate the conditioner in a simple and cost effective manner. The plates 34 can be joined through any suitable means including, but not limited to, welding and gluing. The combination of assembled plates 34 forms the liquid desiccant supply conduits 20, the reservoir, and drain conduits 24 as an integral unitary structure. The size and air processing capacity of the conditioner 12 can be modified by selecting the number of plates 34 to be assembled. This modular form of fabrication provides greater cost savings and ease of production.

The plate 34 comprises a distribution region 42, a processing region 44 and a collection region 46. The surfaces of the distribution region 42 and the collection region 46 are stepped relative to the surface of the processing region 44. The process fluid passage 36 is formed by coupling two plates 34 with the distribution region 42 and collection region 46 of one plate 34 in abutting contact with the distribution region 42 and collection region 46 of the other plate 34. The joining of the individual plates 34 yields a coupled plate 35 (see FIG. 4) as will be further described hereinafter. The cooling fluid passage 38 can thereafter be formed by joining a coupled plate 35 with another coupled plate 35 as will be further described hereinafter.

Referring back to FIG. 3, the distribution region 42 of the plate 34 includes a pair of liquid desiccant supply throughholes 48, a lateral channel 50 in communication between the liquid desiccant supply throughholes 48, and four feeder channels 52 in communication with the lateral channel 50. The processing region includes a plurality of spacers 54 which extends away from the surface of the processing region 44. The spacers 54 function to maintain the space within the process fluid passage 36 as will be described hereinafter. The processing region 44 further includes a plurality of depressions 56 within the surface thereof. Each of the depressions 56 extends below the plane of the processing region 44 and is located proximate to a corresponding spacer 56. Each depression 56 also functions as a spacer in the cooling fluid passage 38 which would be formed on the other side of the plate 34 (i.e., backside). The processing region 44 further includes a first slot 58 and a second slot 60 formed at an opposed end of the plate 34.

The processing region 44 further includes a pair of flow restricting blocks 62 located near the distribution region 42 and may be formed by stamping or thermoformed into the plate 34. The flow restricting blocks 62 are located proximate to the dispensing end of the feeder tubes 52 and functions to slow and spread the flow of the liquid desiccant discharged from the feeder tube 52 directly onto the inside surfaces of the process fluid passage 36. The flow restriction block 62 reduces the spacing in the passage 36 near the dispensing end of the feeder tube 52. The narrow spacing prevents the liquid desiccant from forming into a droplet, thus minimizing bridging of the liquid desiccant that may occur across the passage 36.

Each of the plates 34 further includes alignment tabs 65 which may be thermoformed or stamped into the plates 34.

The alignment tabs 65 are protrusions that can fit into corresponding slots (not shown) located on an adjacent plate 34 for purposes of providing alignment of the plates 34 during assembly of the conditioner 12.

Figure 4:
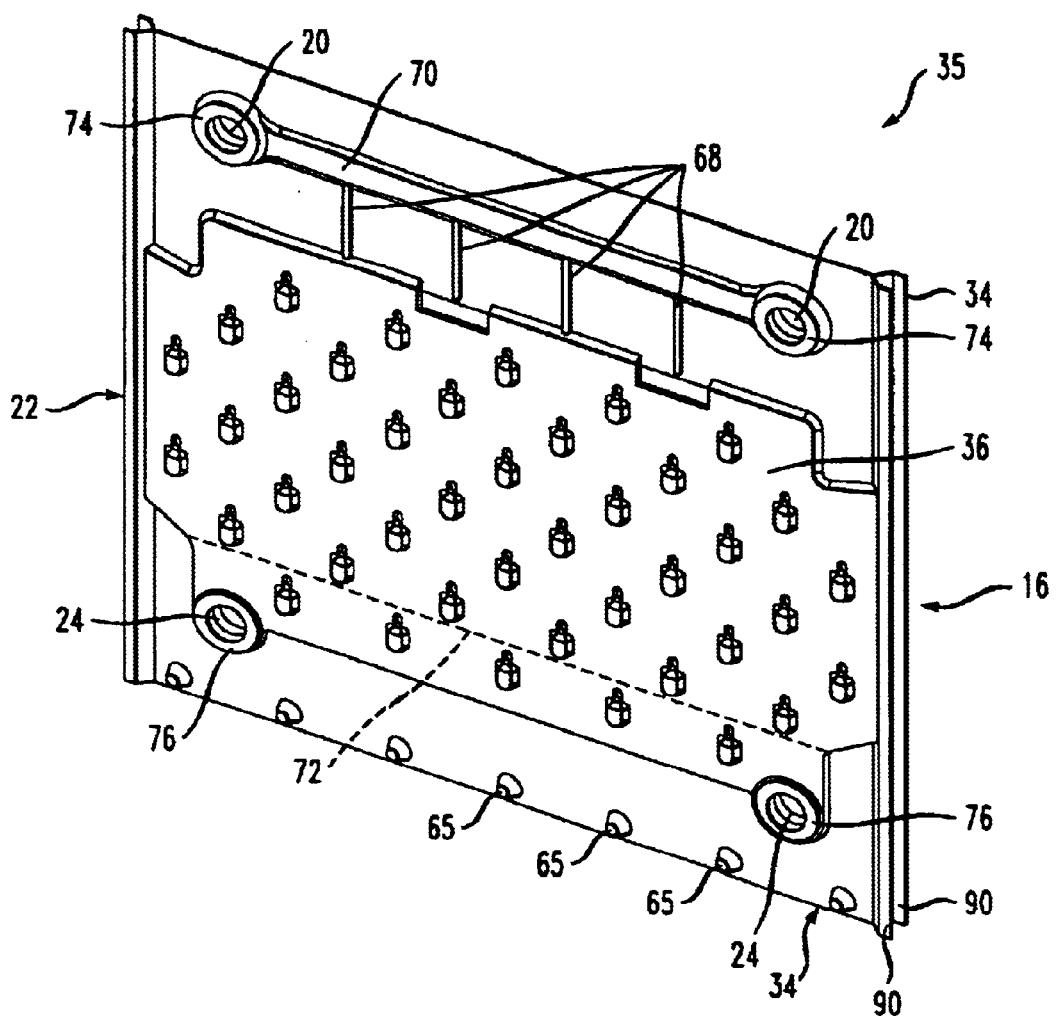
FIG. 4 is a perspective view of a coupled plate formed by the joining of two plates of the type shown in FIG. 3.

Referring to FIGS. 3 and 4, a coupled plate 35 is formed by joining the two plates 34 at the distribution region 42 and collection region 46 of one plate 34 to the distribution region 42 and collection region of the other plate 34, respectively. The resulting joined liquid desiccant supply throughholes 48 form part of the corresponding liquid desiccant supply conduits 20. The joined feeder channels 52 form the corresponding feeder tubes 68 with the joined lateral channels 50 forming a lateral tube 70 to provide fluid communication between the liquid desiccant supply conduits 20 and the feeder tubes 68. The joined liquid desiccant drain throughholes 64 form part of the corresponding liquid desiccant drain conduits 24.

The processing regions 44 of the joined plates 34 form the process fluid passage 36 and a reservoir 72 at the lower end of the passage 36 which opens into the drain conduits 24 for allowing the liquid desiccant to pass out during the operation of the conditioner 12. The joined first slots 58 and the joined second slots 60 of the plates 34 form the corresponding moist process air inlet 16 and dried process air outlet 22.

Figure 5:
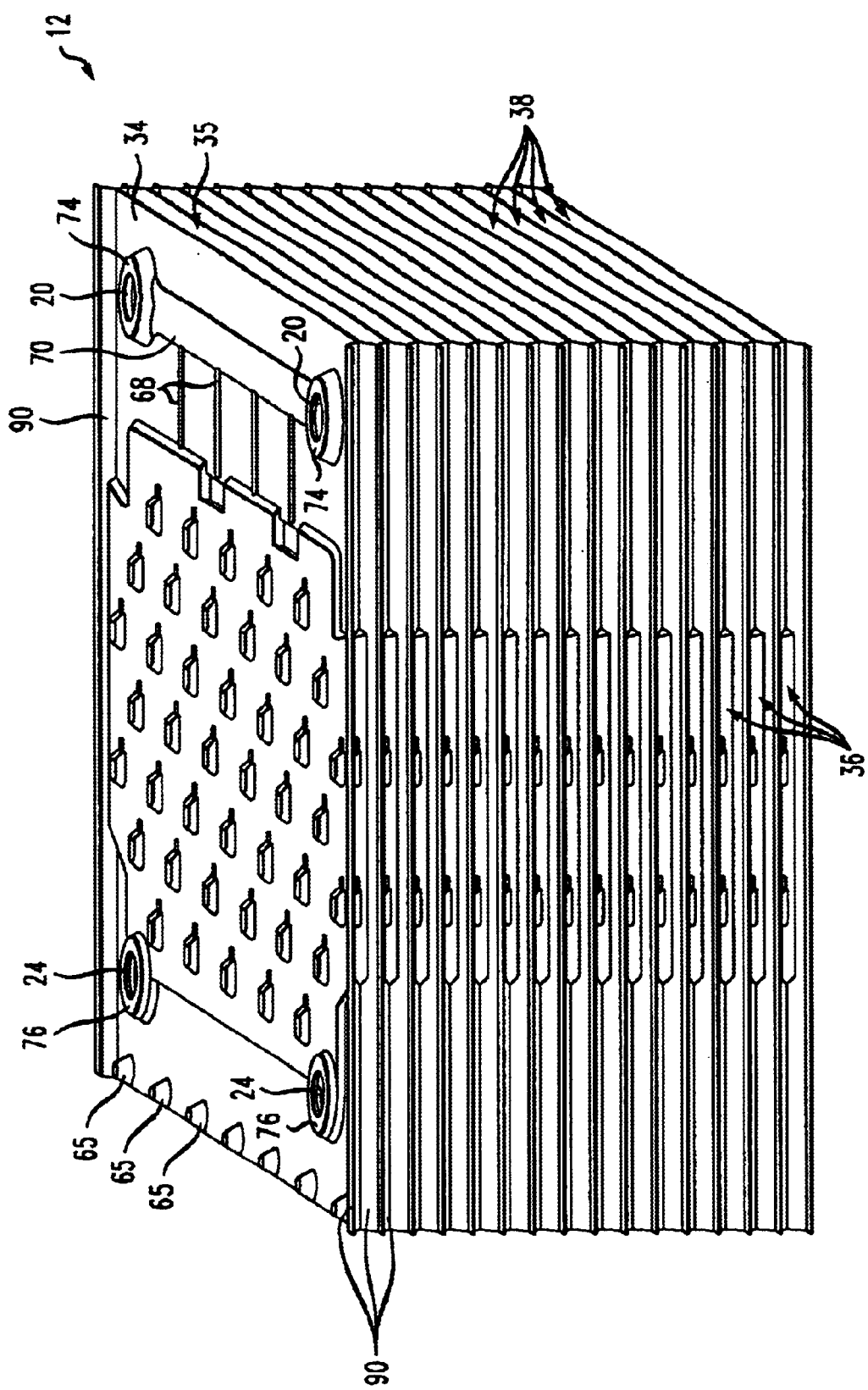
FIG. 5 is a perspective view of a conditioner fabricated from coupled plates of the type shown in FIG. 4.

The coupled plate 35 forms the basic structural unit of the conditioner 12. Additional coupled plates 35 may be assembled in the manner described above and then joined successively to one another to produce the conditioner 12 of the present invention as shown in FIG. 5. The coupled plates 35 may be joined by welding or gluing at corresponding flange portions 74 of the liquid desiccant supply conduits 20 and corresponding flange portions 76 of the liquid desiccant drain conduits 24 to form continuous fluid-tight conduits. Each of the conduits 20 and 24 are fitted with suitable inlet and outlet fittings for supplying and draining, respectively, the liquid desiccant. The joined coupled plates 35 define the cooling fluid passages 38 therebetween. Each of the coupled plates 35 includes edge portions 90 which extends slightly from the sides thereof. The edge portions 90 of the joined coupled plates 35 are also sealed or welded to the edge portions of the adjacent coupled plates 35 to enclose the cooling fluid passage 38 and prevent leakage of the cooling air flow therethrough.

Referring to FIG. 5, the conditioner 12 is shown assembled from a plurality of the coupled plates 35. The size and processing capacity of the conditioner 12 can be varied by selecting the number of coupled plates 35 to be attached as needed.

Figure 6:
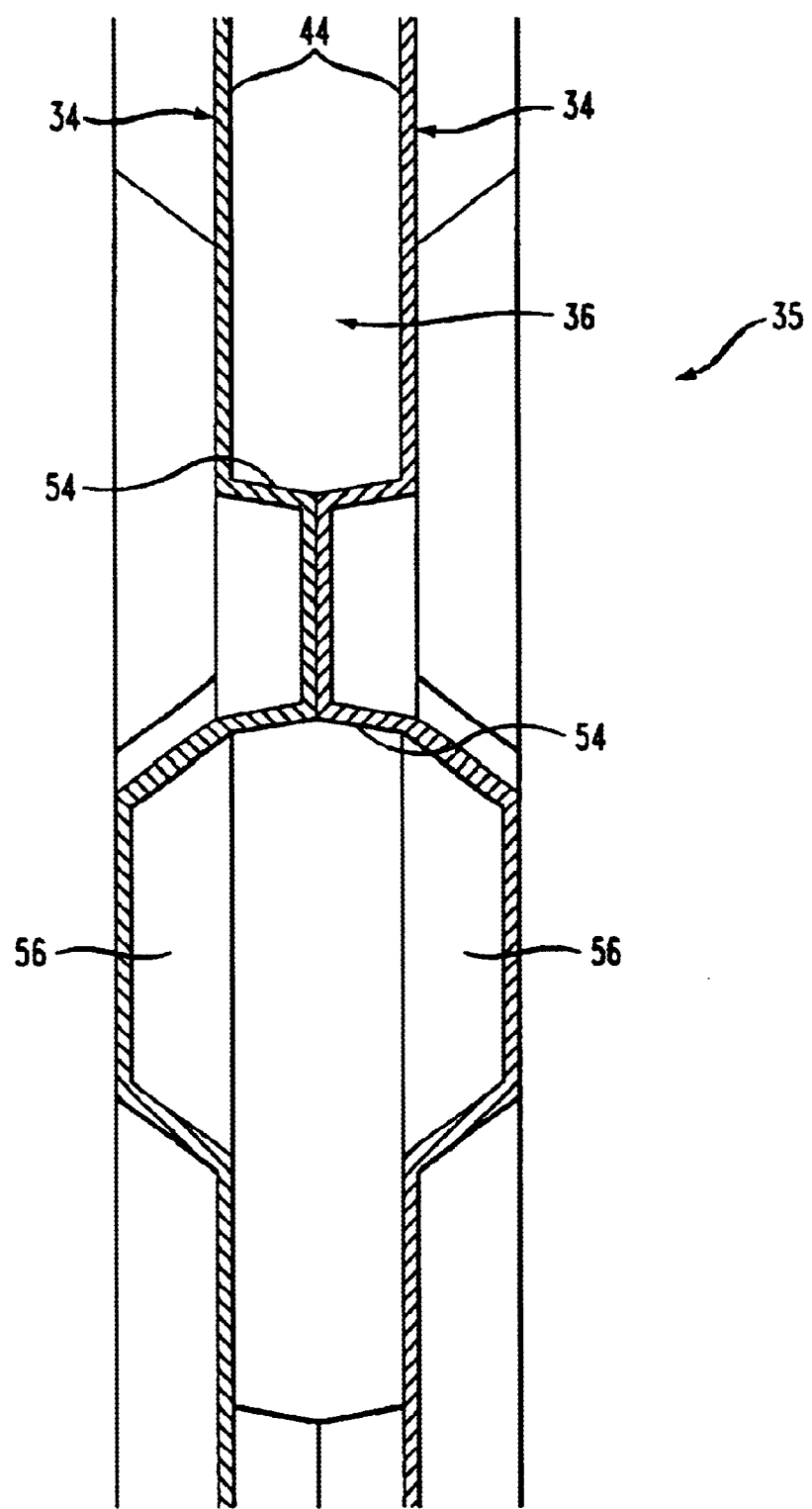
FIG. 6 is an exploded cross sectional view of the coupled plate of the type shown in FIG. 4.

Referring to FIG. 6, an exploded cross sectional view of the coupled plate 35 is shown to provide greater detail of the functional aspects of the spacer 54 and the depression 56 located in the process fluid passage 36. In a coupled plate 35, the spacers 54 of the plate 34 each abut against the corresponding spacers 54 of the other plate 34 to maintain the space between the processing regions 44 of the plates 34, thus keeping the process fluid passage 36 open.

Applicants have observed that when the liquid desiccant encounters the spacer 54 a relatively thicker film of liquid desiccant forms around the spacer 54. The thicker film of liquid desiccant has a greater tendency to bridge across the process fluid passage 36 thus adversely affecting the flow of the process air. The bridging of the liquid desiccant can create a high pressure drop across the process fluid passage 36 and cause the formation of desiccant droplets which may become entrained in the process air flow. Applicants have further discovered that introducing depressions 54 within the plate 34 in proximity to the spacers 54 opposite from the liquid desiccant source of flow substantially reduces undesirable bridging of the liquid desiccant. It is believed that the depressions 54 increases the distance between the inside surfaces of the passage 36, thus minimizing the bridging of the liquid desiccant at the point where the liquid desiccant film is at its thickest. It will be understood that other suitable methods of preventing or at least substantially minimizing the bridging of liquid desiccant. The spacer 54 and the depression 56 can be formed by conventional thermoforming, stamping or embossing techniques. Alternatively, the spacer 54 can be a stud applied adhesively to the plate 34 or formed by a hardening adhesive.

Figure 7:
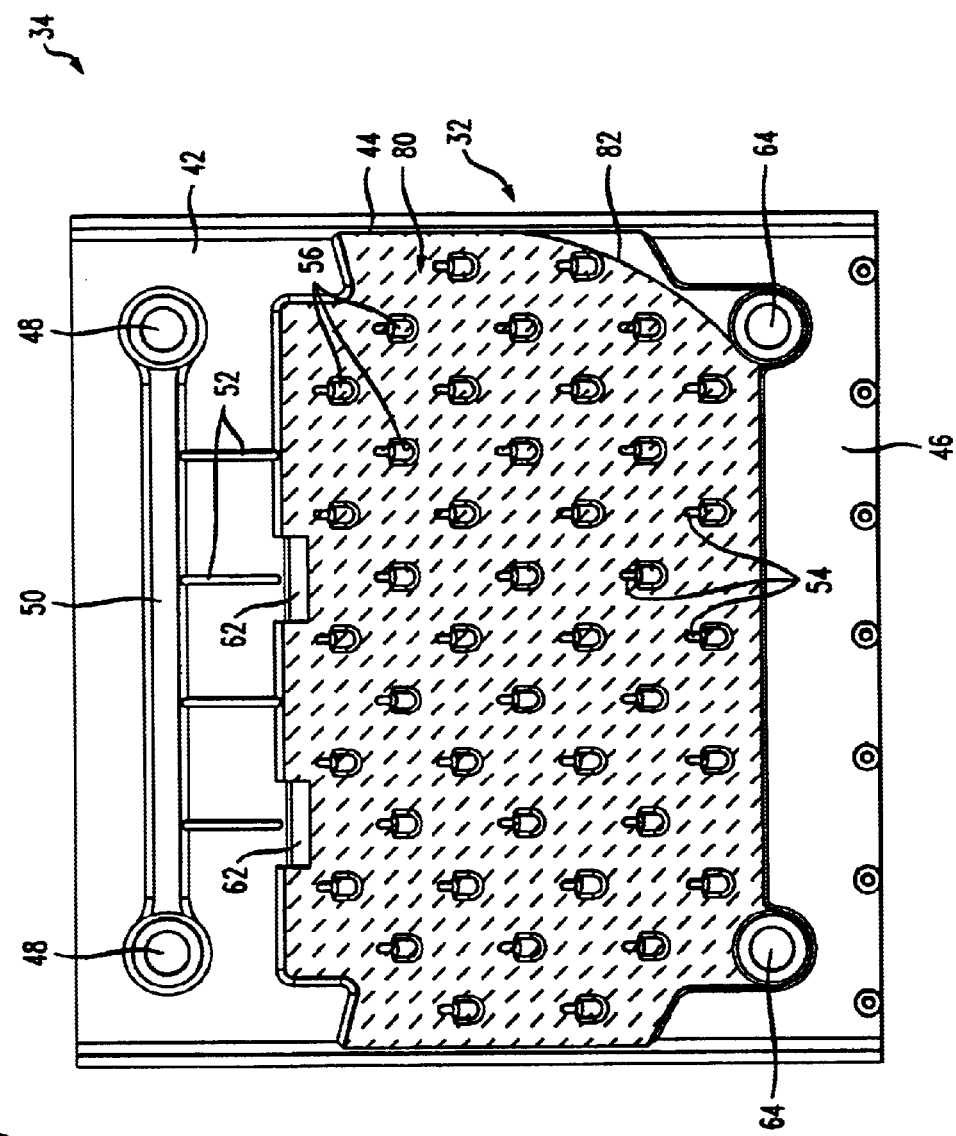
FIG. 7 is a front elevational view of the plate further including a wicking substrate for one embodiment of the present invention.

Referring to FIG. 7, the plate 34 is shown for an alterative embodiment of the present invention. The plate 34 further comprises a wicking substrate 80 overlaying the processing region 44 thereof. The wicking substrate 80 is adapted to permit fluid passage of the liquid desiccant while in contact with the process air. The wicking substrate 80 is suitably contoured to match the surface of the plate 34 including the surface features of the spacers 54 and the depressions 56. The wicking substrate 80 may be further configured with a guiding edge 82 that directs the liquid desiccant away from the trailing edge of the plate 34 into the reservoir 72.

With appropriate modifications, the embodiment described in FIGS. 1 through 7 can be applied to an indirect evaporative cooler. In the indirect evaporative cooler embodiment, a cooling air stream is passed through the first series of passages 36. The process air passes through the inlets 16 into the second series of passages 38, which is maintained dry. A stream of cooling water is delivered through the supply conduits 20 and dispensed into the first series of passages 36 where it flows downwardly along the inside surfaces thereof. The water evaporates into the cooling air stream and cools the inside surfaces of the first air passages which absorbs the heat from the process air flowing through the second series of passages 38, thus producing a indirect evaporative cooling effect.

EXAMPLE 1

Performance Results of an Evaporatively Cooled Liquid Desiccant Dehumidifier System of the Present Invention An evaporatively cooled liquid desiccant dehumidifier system of the present invention was tested and compared to a water-cooled conditioner system. Both systems were operated to process outdoor air at a temperature of about 86° F. and a humidity of about 0.0192 pound of moisture per 1 pound of dry air. The cooling water for the water-cooled conditioner system was supplied by a cooling tower. The liquid desiccant used was 43% lithium chloride solution. The process air was passed through both systems at a velocity of about 900 feet per minute using 12" wide plates with 0.1" gaps between plates. The results of the test are shown in Table 1 below.

TABLE 1

| | Evaporatively Cooled | Water Cooled |
|---|---|---|
| Temperature | 91.3° F. | 92.1° F. |
| Humidity | 0.00911 lb/lb-dry air | 0.00934 lb/lb-dry air |
| Enthalpy Change | 9.82 Btu/lb | 9.37 Btu/lb |

As shown in the results of Table 1, the evaporatively cooled dehumidifier system delivered cooler and drier process air as compared to the water-cooled system. Moreover, the evaporatively cooled dehumidifier system delivered 5% more cooling as indicated by the larger reduction in air enthalpy.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. An air conditioner comprising:
   a plurality of plates arranged in a successively stacked configuration with portions thereof having a spaced apart arrangement, and defining between successive adjacent pairs of plates at said spaced apart portions a first and second series of discrete alternating passages and liquid collecting means for collecting a liquid in the first series of passages, said liquid collecting means comprising
   a reservoir defined within each of the first series of passages proximate the second end of the plurality of plates for collecting the flowing liquid; and at least one liquid drain conduit extending through the plurality of plates in fluid communication with the reservoir for receiving the liquid from the reservoir,
   wherein a first air stream is passed through the first series of passages and a second air stream is passed through the second series of passages; and
   said stacked configuration of plates forming integrally therewith a liquid delivery means for delivering from a source a sufficient quantity of a liquid to the inside surfaces of the first series of fluid passages in a manner which provides a continuous flow of the liquid from a first end to a second end of the plurality of plates while in contact with the first air stream.

2. The air conditioner of claim 1 further comprising wicking means disposed along at least a portion of the inside surfaces of the first series of passages for facilitating the flow of the liquid in a controlled manner.

3. The air conditioner of claim 2 wherein the wicking means is composed of a material selected from of acrylic, polyester, cotton, nylon, rayon and combinations thereof.

4. The air conditioner of claim 1 wherein the liquid is a liquid desiccant and the first air stream is process air.

5. The air conditioner of claim 4 further comprising a regenerator in fluid communication with the liquid collecting means and the liquid fluid delivery means for regenerating the liquid desiccant collected in liquid collecting means and recirculating the liquid desiccant to the liquid delivery means.

6. The air conditioner of claim 4 further comprising heat absorbing fluid delivery means for delivering a sufficient flow of a heat absorbing fluid through the second series of passages to thereby absorb heat from the liquid desiccant flowing in the first series of passages.

7. The air conditioner of claim 6 wherein the heat absorbing fluid delivery means comprises means for generating a flow of water along the inside surfaces of the second series of passages while passing a flow of cooling air through the second series of fluid passages in contact with the flow of water.

8. The air conditioner of claim 1 further comprising at least one spacer disposed on each of the inside surfaces of said first series of passages for maintaining the space therebetween.

9. The air conditioner of claim 8 wherein the spacer comprises a raised portion of the plate.

10. The air conditioner of claim 8 further comprising means for maintaining uniform flow of liquid in proximity to the spacer.

11. The air conditioner of claim 10 wherein the means for maintaining uniform flow of the liquid in proximity to the spacer further comprises at least one depression disposed within the inside surfaces of the first series of passages in proximity to said at least one spacer.

12. The air conditioner of claim 1 wherein each of the plurality of plates further comprises alignment means for successively aligning the plates with one another in the stacked configuration.

13. The air conditioner of claim 12 wherein the alignment means comprises at least two tabs extending from the surface of one plate, and at least two corresponding slots in the surface of an adjacent plate, adapted for mating engagement with the at least two tabs.

14. An air conditioner comprising:
    a plurality of plates arranged in a successively stacked configuration with portions thereof having a spaced apart arrangement, and defining between successive adjacent pairs of plates at said spaced apart portions a first and second series of discrete alternating passages wherein a first air stream is passed through the first series of passages and a second air stream is passed through the second series of passages; and
    said stacked configuration of plates forming integrally therewith a liquid delivery means comprising
    at least one liquid supply conduit extending through the plurality of plates;
    at least one feeder tube in fluid communication with said at least one liquid supply conduit for dispensing the liquid from a dispensing end thereof directly to the inside surfaces of the first series of the passages, and
    dispersing means located proximate to the dispensing end of the at least one feeder tube for dispersing the liquid uniformly along the inside surfaces of the first series of passages.

15. The air conditioner of claim 14 further comprising liquid collecting means for collecting the liquid in the first series of passages.

16. The air conditioner of claim 14 further comprising wicking means disposed along at least a portion of the inside surfaces of the first series of passages for facilitating the flow of the liquid in a controlled manner.

17. The air conditioner of claim 16 wherein the wicking means is composed of a material selected from of acrylic, polyester, cotton, mylon, rayon and combinations thereof.

18. The air conditioner of claim 15 wherein the liquid is a liquid desiccant and the first air stream is process air.

19. The air conditioner of claim 18 further comprising a regenerator in fluid communication with the liquid collecting means and the liquid fluid delivery means for regenerating the liquid desiccant collected in the liquid collecting means and recirculating the liquid desiccant to the liquid delivery means.

20. The air conditioner of claim 18 further comprising heat absorbing fluid delivery means for delivering a sufficient flow of a heat absorbing fluid through the second series of passages to thereby absorb heat from the liquid desiccant flowing in the first series of passages.

21. The air conditioner of claim 20 wherein the heat absorbing fluid delivery means comprises means for generating a flow of water along the inside surfaces of the second series of passages while passing a flow of cooling air through the second series of passages while passing a flow of cooling air through the second series of fluid passages in contact with the flow of water.

22. The air conditioner of claim 14 further comprising at least one spacer disposed on each of the inside surfaces of said first series of passages for maintaining the space therebetween.

23. The air conditioner of claim 22 wherein the spacer comprises a raised portion of the plate.

24. The air conditioner of claim 22 further comprising means for maintaining uniform flow of liquid in proximity to the spacer.

25. The air conditioner of claim 24 wherein the means for maintaining uniform flow of the liquid in proximity to the spacer further comprises at least one depression disposed within the inside surfaces of the first series of passages in proximity to said at least one spacer.

26. The air conditioner of claim 14 wherein each of the plurality of plates further comprises alignment means for successively aligning the plates with one another in the stacked configuration.

27. The air conditioner of claim 26 wherein the alignment means comprises at least two tabs extending from the surface of one plate, and at least two corresponding slots in the surface of an adjacent plate, adapted for mating engagement with the at least two tabs.

28. An air conditioner comprising:
a plurality of plates arranged in a successively stacked configuration with portions thereof having a spaced apart arrangement, wherein each of the plurality of plates further comprises alignment means for successively aligning the plates with one another in said stacked configuration, and defining between successive adjacent pairs of plates at said spaced apart portions a first and second series of discrete alternating passages wherein a first air stream is passed through the first series of passages and a second air stream is passed through the second series of passages; and
said stacked configuration of plates forming integrally therewith a liquid delivery means for delivering from a source a sufficient quantity of a liquid to the inside surfaces of the first series of fluid passages in a manner which provides a continuous flow of the liquid from a first end to a second end of the plurality of plates while in contact with the first air stream.

29. The air conditioner of claim 28 further comprising liquid collecting means for collecting the liquid in the first series of passages.

30. The air conditioner of claim 28 further comprising wicking means disposed along at least a portion of the inside surfaces of the first series of passages for facilitating the flow of the liquid in a controlled manner.

31. The air conditioner of claim 30 wherein the wicking means is composed of a material selected from of acrylic, polyester, cotton, nylon, rayon and combinations thereof.

32. The air conditioner of claim 29 wherein the liquid is a liquid desiccant and the first air stream is process air.

33. The air conditioner of claim 32 further comprising a regenerator in fluid communication with the liquid collecting means and the liquid fluid delivery means for regenerating the liquid desiccant collected in the liquid collecting means and recirculating the liquid desiccant to the liquid delivery means.

34. The air conditioner of claim 32 further comprising heat absorbing fluid delivery means for delivering a sufficient flow of the heat absorbing fluid through the second series of passages to thereby absorb heat from the liquid desiccant flowing in the first series of passages.

35. The air conditioner of claim 34 wherein the heat absorbing fluid delivery means comprises means for generating a flow of water along the inside surfaces of the second series of passages while passing a flow of cooling air through the second series of fluid passages in contact with the flow of water.

36. The air conditioner of claim 28 further comprising at least one spacer disposed on each of the inside surfaces of said first series of passages for maintaining the space therebetween.

37. The air conditioner of claim 36 wherein the spacer comprises a raised portion of the plate.

38. The air conditioner of claim 36 further comprising means for maintaining uniform flow of liquid in proximity to the spacer.

39. The air conditioner of claim 38 wherein the means for maintaining uniform flow of the liquid in proximity to the spacer further comprises at least one depression disposed within the inside surfaces of the first series of passages in proximity to said at least one spacer.

40. The air conditioner of claim 28 wherein the plurality of plates are coated with corrosion resistant material.

41. The air conditioner of claim 35 wherein the alignment means comprises at least two tabs extending from the surface of one plate, and at least two corresponding slots in the surface of an adjacent plate, adapted for mating engagement with the at least two tabs.

* * * * *